Oct. 18, 1927.
W. REILLY
FISH SCALER
Filed Feb. 23, 1926
1,645,970
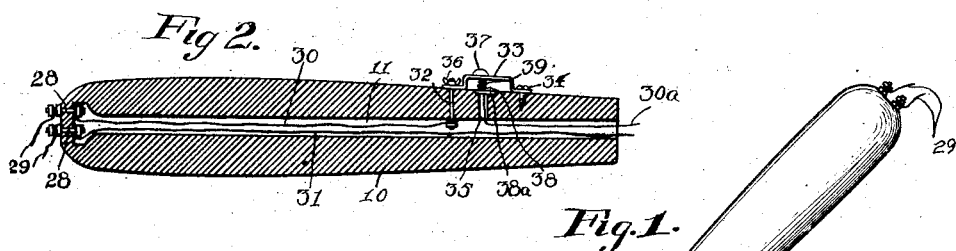
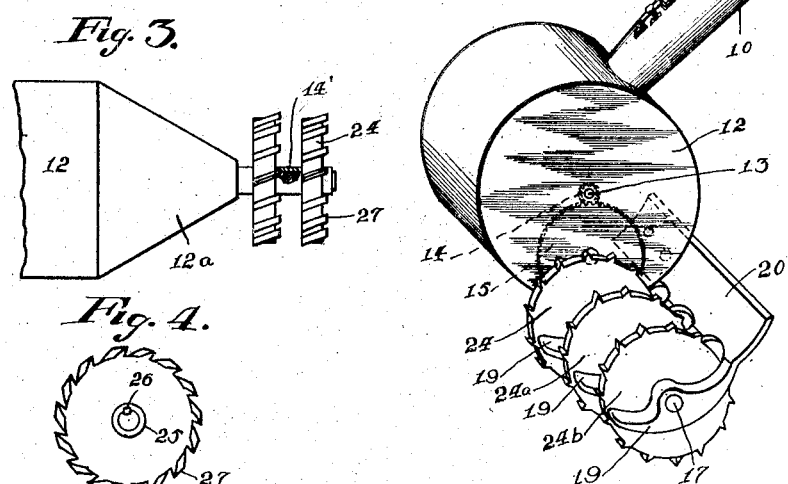
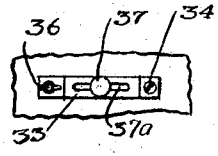
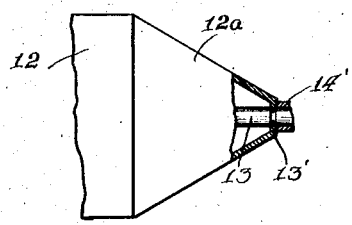
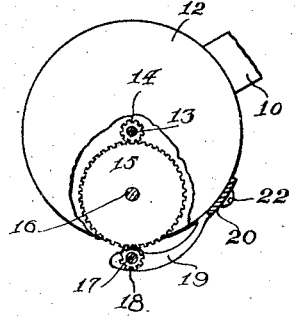
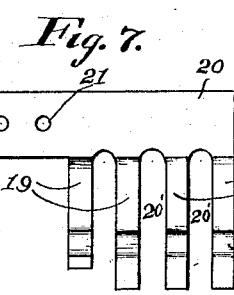
INVENTOR.
William Reilly Patented Oct. 18, 1927.

1,645,970

UNITED STATES PATENT OFFICE.

WILLIAM REILLY, OF WHITE PLAINS, NEW YORK.

FISH SCALER.

Application filed February 23, 1926. Serial No. 89,827.

This invention relates to improvements in fish scalers and has for its object to provide a simple, efficient and inexpensive device of this character.

One of the objects of the present invention is to provide a portable, motor-driven fish scaler designed to facilitate the operation of scaling fish, and to save considerable time in effecting the scaling.

Another object of the present invention is to provide a motor driven and actuated fish scaler wherein use is made of a plurality of fish scaling wheels arranged in parallelism designed simultaneously to engage the scaly surface of a fish.

In carrying out the details of my invention I make use of a special form of fish scaler wheel having its blades disposed obliquely with respect to the axis of the shaft upon which the wheel is mounted; these blades also being deflected laterally of one side of this wheel.

A bracket plate is removably attachable to the motor casing of my invention and is provided with a series of bearings for accommodating the several fish scaler wheels, transmission gearing being provided for reducing the motor speed at the point of application of power to the fish scaler wheels.

With the above and other objects in view my invention consists in the combination, arrangement and details of construction disclosed in the drawings and specification and then more particularly pointed out in the appended claims.

In the drawings wherein similar reference numerals designate similar parts thruout the respective views, Figure 1 is a perspective view of the parts of my invention, Figure 2 is a longitudinal view of the handle attached to the motor, Figure 3 is a fragmental detail view of my invention showing a special form of fish scaler wheel, Figure 4 is a front elevation of the fish scaler wheel, Figure 5 is a fragmental detail view of a closure for the casing of the motor at the point where it engages the motor shaft, Figure 6 is a fragmental, sectional view showing the transmission gearing carried by the motor, Figure 7 is a front elevation of the bracket bearing about to be described, and Figure 8 is a fragmental top plan view of the electrical switch carried by the handle.

In the drawings which are merely illustrative of my invention 10 designates a preferably hollow handle made from wood or other suitable material, the bore therein being designated 11. 12 designates a suitable preferably cylindrical casing housing an electrical motor (not shown) of conventional design. The motor shaft 13 projects thru the closed casing 12 and carries fixedly thereon a pinion 14 which meshes with a large gear 15 trunnioned upon a pintle 16 mounted upon the outside of the casing 12. The large gear 15 meshes with the pinion 18 fixed upon a shaft 17 passing thru a series of separated arcuate shaped arms 19 formed upon a bracket bearing or plate 20 secured by fasteners 22 upon the exterior side of the motor casing 12. It will be seen that the bearing arms 19 are curved and deflected as shown in Figure 6 to present the pinion 18 in alinement with shaft 16 and shaft 13.

I design to employ one or more fish scaling wheels 24, 24ª, 24ᵇ, etc. which project rotatably into the slots 20' intervening between the arms 19, the arms 19 being formed with intermediate bearings 23 in which the shaft 17 rotates. It will be noticed that each scaler wheel consists of a plurality of blades 27 formed upon its periphery upon which the scaly surface of the fish contacts. The blades are arranged obliquely with respect to the axis of the shaft upon which the scaler wheel is mounted, and these blades may also preferably extend laterally of one side of the wheel as illustrated in Figure 3. When the motor shaft 13 rotates, the pinion 14 turns the gear 15 with which it meshes, and the gear turns the pinion 18 which drives shaft 17 which shaft rotates all of the fish scaling wheels 24, the latter having collars 25 engaging the spline 26 formed upon shaft 17.

In Figure 5 I show the motor casing 12 formed with a reduced conical portion 12ª, terminating in an annular sleeve 13' which embraces the reduced section of the shaft 13, a collar 14' encircling this shaft for the purpose of preventing fish scale reaching inside the casing, that might impede the smooth working of the parts of my invention.

In order to open and close the electrical circuit to the motor of the electrical fish scaler I provide a switch make and break device exteriorly of the handle 10. At the closed end of this handle are secured the binding posts 28, carrying nuts 29 for clamping thereonto a flexible terminal that is associated with the usual socket (not shown). To lead-in wires 30 and 31 leave these binding posts 28 and extend into bore 11 of the handle; the wire 30 is secured directly to the binding post 32 which also serves to fasten down the switch member 33 which is in the shape of an inverted U-shaped brace, having the top slot 37ª shown in Figure 8. A contact shoe 38 presses slidably upon a fixed contact 38ª secured upon the handle 10 in a manner to close the port 35 formed therein for communication with the bore 11. A plunger 37 enlarged on top of member 33 so as not to project into slot 37ª, is pressed down upon contact 35 by means of a spring 39 bearing at one end to member 33 and at its opposite end to contact 38. Wire 30ª is secured to contact 35 and extends thru the bore 11 of handle 10, and this wire 30ª and wire 31 both run to points where they are connected to the motor in casing 12. It will be seen that while the fingers of the operator's hand engages handle 10 they may slide plunger 37 into contact with contact 35 or disengage it from said contact, in one case closing the circuit to the electrical motor and in the other case disrupting the circuit.

It will also be seen that the bracket plate 20 is removably secured upon the cylindrical shape of the casing and properly positions the several scaling wheels with respect to the motor shaft 13, so that these wheels extend in parallelism.

Numerous modifications may be resorted to in practice without departing in principle from the details of construction covered in the appended claims.

I claim:

1. A fish scaler comprising a motor having a casing provided with a handle, a plate mounted at the side of the casing and having an end portion projecting beyond the face thereof, said plate having a series of spaced arms, a shaft journaled in the arms, means for operatively connecting said shaft with the shaft of the motor and scaling wheels mounted upon the shaft and located between the arms.

2. A fish scaler attachment adapted to be applied to the casing of a motor consisting of a transversely curved plate provided at one edge with a series of spaced arms, a shaft journaled in the arms and bridging the space between the arms and scaling wheels mounted upon the shaft and located in the spaces between the arms.

In witness whereof he has hereunto set his hand this twenty-seventh day of January, 1926.

WILLIAM REILLY.